United States Patent [19]

Risk

[11] Patent Number: 5,224,193
[45] Date of Patent: Jun. 29, 1993

[54] FIRST ORDER MODE FREQUENCY DOUBLER SYSTEM AND METHOD

[75] Inventor: William P. Risk, Mountain View, Calif.

[73] Assignee: International Business Machines Corporation, Armonk, N.Y.

[21] Appl. No.: 585,441

[22] Filed: Sep. 20, 1990

[51] Int. Cl.$^5$ ............................................. G02B 6/26
[52] U.S. Cl. ................................... 385/122; 385/28; 385/50; 369/112; 359/328; 359/332
[58] Field of Search ............... 385/27, 28, 29, 50, 385/122, 132; 359/328, 332; 369/100, 112

[56] References Cited

U.S. PATENT DOCUMENTS

| | | | |
|---|---|---|---|
| H668 | 9/1989 | Rand | 385/122 |
| 4,666,255 | 5/1987 | Taylor et al. | 385/7 |
| 4,684,215 | 8/1987 | Shaw et al. | 385/4 |
| 4,735,485 | 4/1988 | Shaw et al. | 385/4 |
| 4,761,049 | 8/1988 | Burns et al. | 385/40 |
| 4,763,019 | 8/1988 | Duguay et al. | 359/328 |
| 4,784,450 | 11/1988 | Jain et al. | 359/332 |
| 4,792,207 | 12/1988 | Shaw et al. | 385/28 |
| 5,112,122 | 5/1992 | Chikuma et al. | 359/332 |

FOREIGN PATENT DOCUMENTS 1-057245 3/1989 Japan.
1-068735 3/1989 Japan.

OTHER PUBLICATIONS

Robert N. Thurston, et al., "Analysis of Mode Separation in Multichannel Branching Waveguides," IEEE Journal of Quantum Electronics, vol. QE-23, No. 8, pp. 1245-1255, Aug. 1987.
Robert N. Thurston, et al., "Mode Separation and Switching in Multichannel Branching Optical Waveguides," SPIE, vol. 836 Optoelectronic Materials, Devices, Packaging, and Interconnects (1987), pp. 211-219.

Primary Examiner—Frank Gonzalez
Attorney, Agent, or Firm—Douglas R. Millett

[57] ABSTRACT

A first section of a waveguide channel is made of a nonlinear crystal material. A second section of the waveguide has a plurality of diverging channels. Each of the diverging channels is of a width which supports one of the modes of second harmonic generated light from the first section. First order mode second harmonic light is obtained at the end of one of the diverging channels.

11 Claims, 3 Drawing Sheets

FIRST ORDER MODE FREQUENCY DOUBLER SYSTEM AND METHOD

BACKGROUND OF THE INVENTION

1. Field of the Invention

This invention relates to frequency doubling of light and more particularly to the use of a branching waveguide to generate first order mode frequency doubled light.

2. Description of the Prior Art

Semiconductor diode lasers are used in optical data storage systems. The gallium-aluminum-arsenide (GaAlAs) diode laser is one example and it generates light in the near-infrared range (860 nanometers wavelength). The light from the laser is focused onto a spot on the optical disk in order to record each bit of data. The spot size is equal to $\lambda/2(N.A.)$, where $\lambda$ is the wavelength of the light and (N.A.) is the numerical aperture of the focusing lens. In typical systems, the (N.A.) is approximately 0.5 and the resulting spot size is 860 nanometers in diameter.

It is apparent that if the wavelength of the laser light can be cut in half, the diameter of the spot size will also be cut in half and the overall density of the optical disk will be quadrupled. Unfortunately, laser diodes which produce light in the blue range (430 nanometers in wavelength) are not yet available. Research in this area has concentrated on ways to convert the infrared light from the laser diode into blue light.

One technique to convert light to a higher frequency is known as second harmonic generation (SHG). Light is passed through a nonlinear crystal, such as potassium niobate ($KNbO_3$) and the second harmonic light (light at twice the frequency of the fundamental light) is generated.

These methods of SHG typically use bulk crystals. The power of the blue light generated is proportional to $1^2/A$, where 1 equals the length of the crystal and A equals the area of the focussed beam. Optimally, the length should be as long as possible and the area of focus very small. The problem is that with traditional optical focussing in bulk crystals, the beam can be focussed in a small area for only a short length before the light begins to diverge. Conversely, the light can be focussed for a longer length of the crystal, but at a much larger area of focus. The result is that the SHG process is very inefficient. For example, a hundred milliwatts of input fundamental frequency light results in only 10 microwatts of output second harmonic light. This is not enough power for use in optical storage systems.

One solution to this problem is to do the SHG process in a nonlinear crystal waveguide. Here the light can be confined to a small area (the cross section of the waveguide) for the entire length of the waveguide.

One problem with SHG in waveguides is that the second harmonic light is generally produced in a plurality of higher-order modes of the waveguide. This occurs because dispersion of the waveguide causes the effective index of the lowest-order mode at the second harmonic to be higher than that of the lowest order mode of the fundamental light. Phase matching can usually be obtained in simple planar or channel waveguides between the lowest order mode at the fundamental frequency light and the higher order modes of the second harmonic light. Typically, the waveguide will be designed to be a single mode at the fundamental wavelength and will support a few (approximately 2 to 4) modes at the second harmonic wavelength.

One method for conversion of the higher-order second harmonic mode to a lower-order mode is the use of a directional coupler which is designed to couple a higher-order mode in one waveguide to the lowest-order mode in a second waveguide which is parallel to the first waveguide. This coupling is achieved by designing the waveguides such that the effective index for the higher-order mode in the first guide is identical to the effective index for the lowest-order mode in the second guide. The evanescent field of the higher-order mode in the first guide will then preferentially excite the lowest-order mode in the second guide. Fabrication of such a coupler requires precise knowledge of how the physical parameters such as width and index profile of the waveguide will affect the effective index of modes within the waveguide, and in addition, requires the ability to precisely control fabrication conditions to achieve the desired physical parameters. The low fabrication tolerances required make the directional coupler impractical. It may be possible to overcome this difficulty by adjusting the effective indexes electro-optically, but this would require a far more complex structure and would demand precise control of the waveguide.

What is needed is an inexpensive nonlinear crystal waveguide which produces second harmonic generated light in a first order mode.

SUMMARY OF THE INVENTION

Briefly, in a preferred embodiment, the present invention comprises a first section waveguide channel which is made of a nonlinear crystal. The first section waveguide channel is surrounded by a material having an index of refraction lower than the nonlinear crystal material. A second section waveguide channel is connected to the first section. The second section has a plurality of diverging channel branches. Each one of said diverging channel branches is of a width which supports one mode of the second harmonic generated light. First order mode second harmonic generated light is obtained at the end of one of these diverging channels.

For a fuller understanding of the nature and advantages of the present invention reference should be made to the following detailed description taken in conjunction with the accompanying drawings.

DESCRIPTION OF THE PREFERRED EMBODIMENTS

Figure 1:
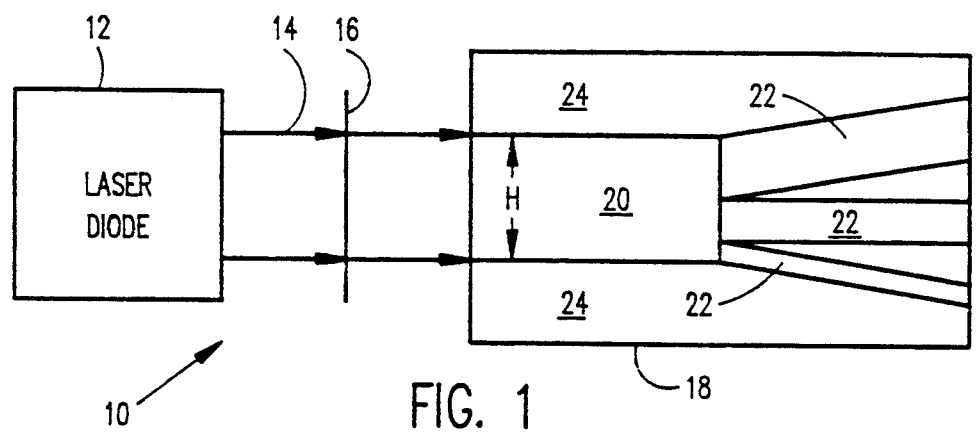
FIG. 1 is a schematic diagram of a frequency doubler laser system of the present invention.

FIG. 1 shows a schematic diagram of a first order mode frequency doubler laser system of the present invention and is designated by the general reference 10. System 10 comprises a laser diode 12. Laser diode 12 may be a strained-layer indium-gallium-arsenide (InGaAs) laser diode (900-1100 nm wavelength), a gallium-aluminum-arsenide (GaAlAs) laser diode (750-900 nanometers wavelength) or equivalent laser diode.

A light beam 14 emitted from laser 12 passes through an optical coupler 16 which couples the light into a waveguide 18. Coupler 16 may be a lens. Waveguide 18 is comprised of a main channel 20 which is made of a nonlinear crystal material. Potassium titanyl phosphate (KTP) is the nonlinear crystal material used in the preferred embodiment. The main channel 20 is connected to a plurality of diverging channels 22. The diverging channels 22 may be made of any light transmitting material, but in the preferred embodiment they are also made of a nonlinear crystal. The main channel 20 and the diverging channels 22 are surrounded by an outer wall 24. Outer wall 24 is made of a material which has an index of refraction less than that of the main channel 20 and the diverging channels 22. Main channel has a width H. Channels 20 and 22 have a depth of 1-5 microns in the preferred embodiment.

The main channel 20 is of a width and length which optimizes the efficiency of the SHG process. This will usually result in a channel 20 which supports a single mode at the fundamental light wavelength (infrared) and a few modes (approximately 2-4) at the second harmonic wavelength (blue light). In the preferred embodiment the channel 20 is 5-10 mm in length and 5-15 microns in width.

The number of modes (m) of fundamental frequency light created is determined by the formula $$m > \frac{2H(n^2 - n_0^2)^{\frac{1}{2}}}{\lambda} > (m - 1)$$

where $\lambda$ is the vacuum wavelength of the light in the channel (fundamental frequency light in this case), and n and $n_0$ are the indexes of refraction of the channel 20 and the outer wall 24, respectively. As mentioned above, for optimal SHG, the channel 20 will be a width which will allow a single mode (m=1).

The number of modes of the SHG light will be higher than the number of modes of the fundamental light. For example, if a first order mode fundamental frequency light exists in channel 20, then a first, second and a third order modes of second harmonic light could also exist. The number of diverging channels 22 is equal to the number of modes of the second harmonic light in channel 20.

Figure 2:
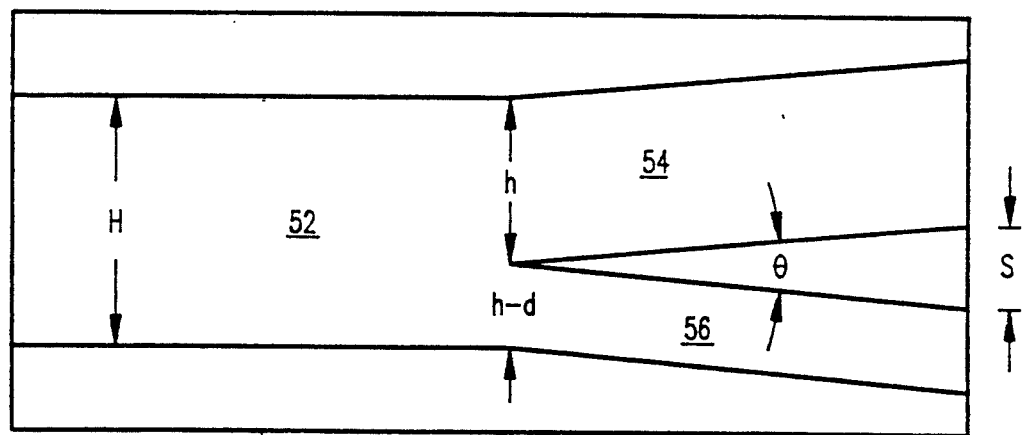
FIG. 2 is a schematic diagram of a two mode waveguide for the system of FIG. 1.

FIG. 2 illustrates a waveguide 50 which may be used in system 10. Waveguide 50 is constructed similar to waveguide 18 of FIG. 1. Waveguide 50 has a main channel 52 of width H, a first diverging channel 54 of width h, and a second diverging channel 56 of width h-d. For channel 54 to contain a single mode, $h < \lambda/2(n^2 - n_0^2)^{\frac{1}{2}}$. Note that $\lambda$ equals the wavelength of the SHG light in this case. The width of channel 52 equals the sum of the widths of the channels of 54 and 56. Hence, H equals 2h−d, where d/h is less than 1. The diverging angle $\theta$ between channels 54 and 56 is less than two milliradians and the separation s between channels 54 and 56 at the end of waveguide 50 is approximately 10 microns. Waveguide 50 is used where a first and second order modes of second harmonic light exist in channel 52.

Figure 3:
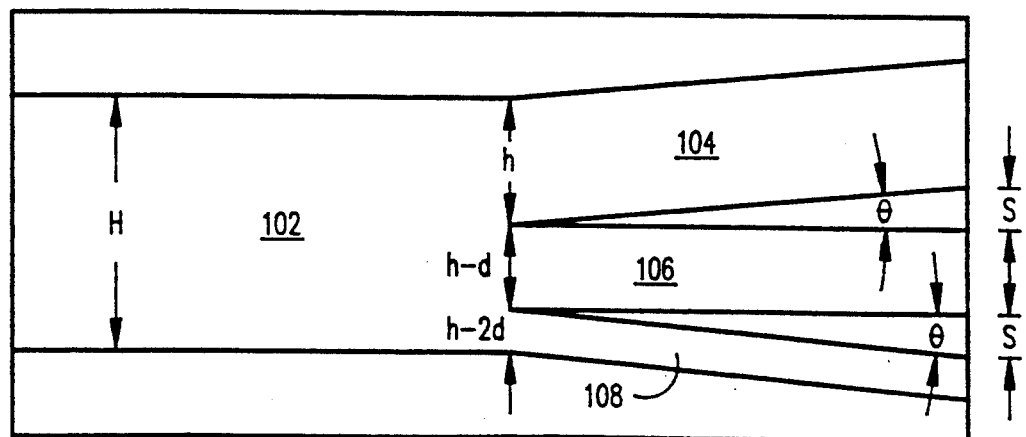
FIG. 3 is a schematic diagram of a three mode waveguide for the system of FIG. 1.

FIG. 3 illustrates a waveguide 100 which may be used in system 10. Waveguide 100 is constructed similar to waveguide 18 of FIG. 1. Waveguide 100 has a main channel 102 of width H, a first diverging channel 104 of width h, a second diverging channel 106 of width h-d, and a third diverging channel 108 of width h-2d. For channel 104 to contain a single mode, $h < \lambda/2(n^2 - n_0^2)^{\frac{1}{2}}$. Note that $\lambda$ equals the wavelength of the SHG light in this case. H equals 3h−3d, where d/h<⅓. The diverging angle $\theta$ between channels 104 and 106, and 106 and 108 is less than 2 milliradians and the separation s between channels 104, 106 and 108 is approximately 10 microns. In one example of the waveguide 100, the depth is approximately 2 microns, H is approximately 5 microns, and the three branches have widths of approximately 2.5, 1.7 and 0.8 microns. Waveguide 100 is used where 3 modes of second harmonic light exist in channel 102.

Figure 4:
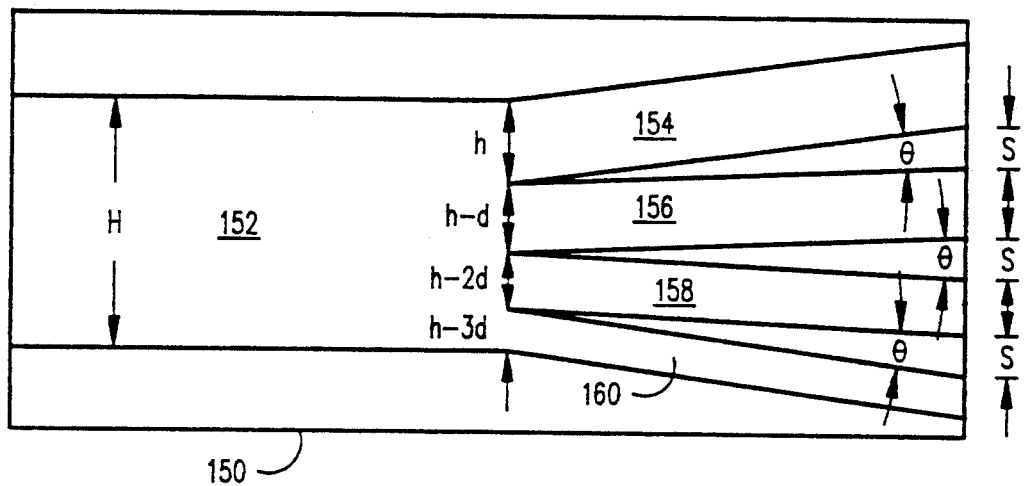
FIG. 4 is a schematic diagram of a four mode waveguide for the system of FIG. 1.

FIG. 4 illustrates a waveguide 150 which may be used in system 10. Waveguide 150 is constructed similar to waveguide 18 of FIG. 1. Waveguide 150 has a main channel 152, a first diverging channel 154, and second diverging channel 156, a third diverging channel 158, and a fourth diverging channel 160. For channel 154 to be single mode, $h < \lambda/2(n^2 - n_0^2)^{\frac{1}{2}}$. Note that $\lambda$ equals the wavelength of the SHG light in this case. H equals 4h−6d where d/h is less than 1/6. The diverging angle $\theta$ between the diverging channels is less than 2 milliradians and the separation between the channels 154, 156, 158 and 160 at the end of waveguide 150 is approximately 10 microns. Waveguide 150 is used where a first, second, third and fourth order modes exist in channel 152.

One way to make the waveguide of the present invention is by a photolithographic process. A flat surface of a nonlinear crystal is covered with chromium. Photoresist is placed where the channels are desired. The photoresist is exposed and the chromium stripped away leaving the channel portion exposed. The crystal is then placed in a molten bath of rubidium nitrate. The rubidium ions are allowed to penetrate the exposed channel portions to a depth of 1-5 microns. The crystal is then removed from the bath and the remaining chromium stripped away. The rubidium ions dope the channel so that the channel has a higher index of refraction than the surrounding nonlinear crystal. Other dope materials such as thallium or cesium may be used.

Figure 5:
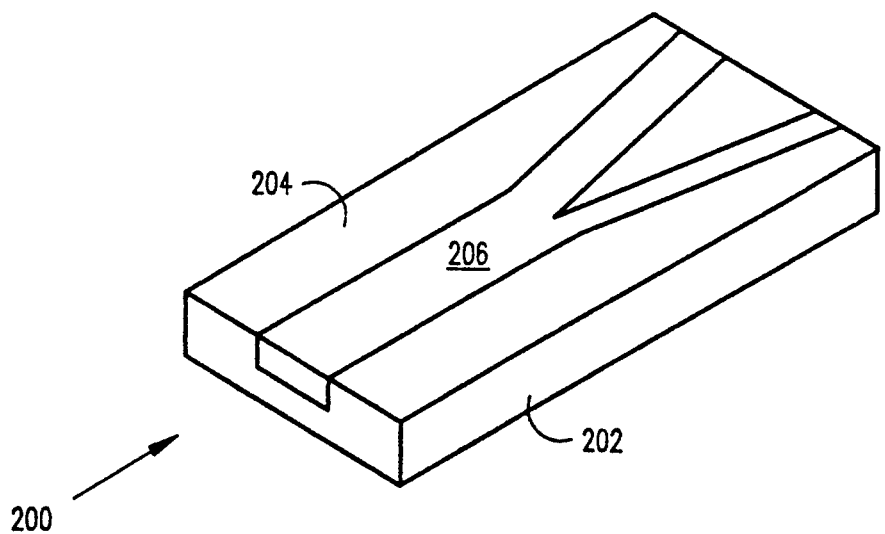
FIG. 5 is a perspective view of an embodiment of the present invention.

FIG. 5 shows a perspective view of a waveguide 200 made by the photolithographic process described above. A nonlinear crystal slab 202 has a top surface 204 which has been impregnated with rubidium ions in a channel section 206 to a depth of 1-5 microns. The dimensions of channel section 206 are as those described for the waveguide 50 of FIG. 2.

Referring again to FIG. 1, the operation of system 10 may now be understood. Fundamental frequency light from laser 12 is coupled to channel 20 of waveguide 18. Fundamental light is converted to second harmonic light in channel 20. The second harmonic light is generated in a first, second and third order modes. The second harmonic light enters the diverging channels 22. As the separation between the channels 22 becomes large, the modes of the second harmonic light in the channel 20 are transformed to single mode second harmonic light in each individual diverging channels. In other words, the modes of light are separated into separate channels and exist as first order mode light in their respective channels. The amount of light produced by each channel is determined by the frequency of laser 12. The first order mode light in channels 22 have slightly different wavelengths, with the larger channels having slightly larger wavelength than the smaller channels. Each channel will have its maximum output at a slightly different frequency of laser 12. Laser 12 may be tuned to produce the maximum light in the desired channel. In the preferred embodiment, it is desired to produce the maximum amount of single mode light from the smallest channel. This is because the light from the smallest channel will have the highest frequency. For example, laser 12 may produce near infrared light (approximately 860 nm in wavelength). Each of channels 22 will have a frequency of laser 12 at which they will produce a maximum amount of first order mode blue light. The exact frequency of the blue light will be different for each channel.

In waveguide 50 of FIG. 2, a single first order mode of fundamental light exists in channel 52. Second harmonic light in a first and second order modes may exist at the end of channel 52. First order second harmonic light exits channel 56.

In waveguide 100 of FIG. 3, a first order mode of fundamental light exists in channel 102. Second harmonic light at first, second and third quarter modes may exist at the end of channel 102. First order second harmonic light exits channel 108.

In waveguide 150 of FIG. 4, a first order mode of fundamental light exists in channel 152. Second harmonic light at first, second, third and fourth order modes may exist at the end of channel 152. First order second harmonic light exits channel 160.

A more thorough discussion of the physics involved in mode separation in branching channels is given in the articles by R. N. Thurston, SPIE vol. 836 (1987), pp. 211 and R. N. Thurston, et al., *IEEE Journal of Quantum Electronics,* August 1987, vol. QE-23, no. 8, pp. 1245. Although the dimensions and angles for the preferred embodiments have been given, different applications may require modelling based on the equations contained in these articles to ensure proper mode separation in the branching channels.

The present invention results in an efficient conversion of higher order second harmonic light to first order second harmonic light. It has been found that in excess of 90% of the power in the higher order modes is converted to the single mode output.

Figure 6:
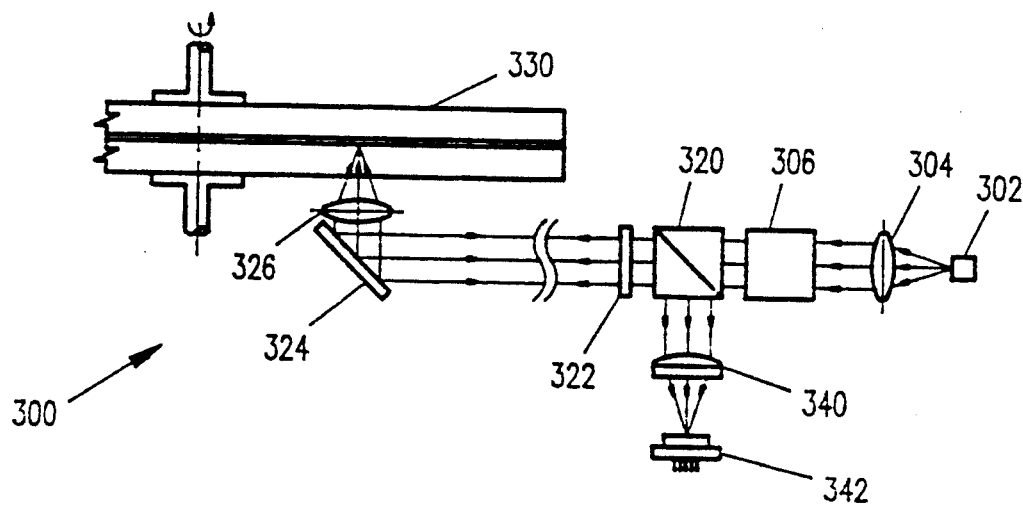
FIG. 6 is a schematic diagram of a data storage system of the present invention.

FIG. 6 shows a phase change optical disk drive system 300 which uses a laser system 302. Laser system 10 may be used for system 302. The light from system 302 is collimated by a lens 304 and passes to a circularizing optical element 306. Element 306 emits light having a circular cross-sectional beam pattern. Element 306 may be a prism.

The light then passes through a polarizing beam splitter 320 and a quarter-wave plate 322. The light is reflected off of a mirror 324 and is focussed by a lens 326 onto a optical recording medium 330. Medium 330 may be a phase change type of optical recording medium.

The light reflected from media 330 returns through lens 326, is reflected off of mirror 324, passes through plate 322 to beam splitter 320. Reflected light is then diverted by beam splitter 320 to a astigmatic lens 340.

Lens 340 focuses the reflected light onto an optical detector 342. The recorded spots of the medium 330 have different reflectivities and these differences are detected by optical detector 342 as data ones and zeros. Detector 342 also provides tracking and focus signals.

Figure 7:
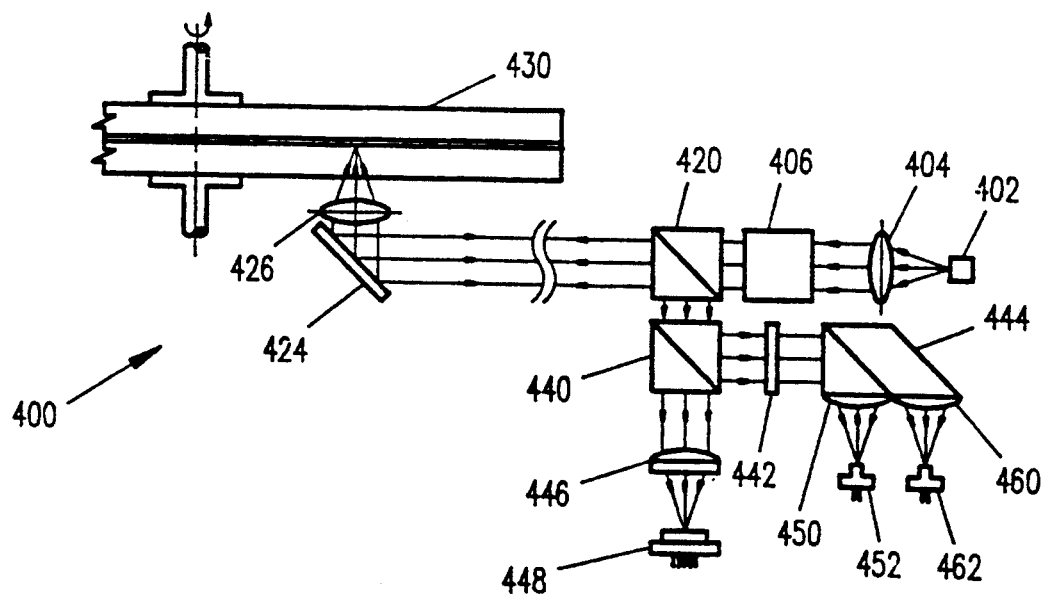
FIG. 7 is a schematic diagram of an alternative data storage system.

FIG. 7 shows a magneto-optic disk drive system 400 which uses a laser system 402. Laser system 10 may be used for system 402. The light from system 402 is collimated by a lens 404 and passes to a circularizing optical element 406. Element 406 emits light having a circular cross-sectional beam pattern. Element 406 may be a prism.

The light then passes through a leaky polarizing beam splitter 420. Beam splitter 420 has reflectivities of $R_p > 0$ and $R_s$ approximately equal to one. (p and s represent the orthogonal polarized components of the light). The light is then reflected off of a mirror 424 to a lens 426 and is focussed onto an optical recording medium 430. Medium 430 may be a magneto-optic type of optical recording medium.

The light reflected from medium 430 returns through lens 426 reflects off of mirror 424, and enters beam splitter 420. Beam splitter 420 diverts the reflected light to an amplitude beam splitter 440. Reflected data light is diverted to a half wave plate 442 and a beam splitter 444. Reflected light of other amplitudes passes straight through beam splitter 440. This light is focussed by an astigmatic lens 446 to a quad detector 448 to produce tracking and focus signals.

The medium 430 has recorded spots having either an up or a down magnetic domain. The plane of polarization of light reflected off of these spots is rotated one way or the other depending upon the direction of the magnetic domain of the spot. Beam splitter 444 separates the reflected light depending upon which way the plane of polarization has been rotated. The separated beams go to a lens 450 and an optical detector 452 or to a lens 460 and an optical detector 462. The difference in output signals of detectors 452 and 462 are the data ones and zeros. A more detailed explanation of optical disk drive systems is given in "Gradient-Index Optics and Miniature Optics," SPIE, vol. 935, pp. 63 (1988) by Glenn Sincerbox.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A frequency doubler system comprising:
an electromagnetic radiation source;
a waveguide for receiving fundamental frequency electromagnetic radiation from the electromagnetic radiation source, having a first section waveguide channel comprising a nonlinear crystal for converting a fundamental frequency electromagnetic radiation to a second harmonic electromagnetic radiation, the waveguide having a second section waveguide channel optically connected to the first section, the second section having a plurality of diverging branch channels, each branch channel supporting a different mode of said second harmonic electromagnetic radiation.

2. The system of claim 1 further including:
a coupling means in optical communication with the electromagnetic radiation source and the waveguide, for coupling said fundamental frequency electromagnetic radiation from the electromagnetic radiation source to the waveguide.

3. The system of claim 1, wherein the plurality of diverging branch channels are comprised of a nonlinear crystal.

4. The system of claim 1, wherein the angle of divergence of said branch channels is less than 2 milliradians.

5. A frequency doubler system comprising:
a first section waveguide channel having a nonlinear crystal for converting a fundamental frequency electromagnetic radiation to a second harmonic electromagnetic radiation;
a second section waveguide channel optically connected to the first section, the second section having a plurality of diverging branch channels for separating a plurality of modes of said second harmonic electromagnetic radiaton.

6. The device of claim 5, wherein the plurality of diverging branch channels are comprised of a nonlinear crystal.

7. The device of claim 5, wherein the angle of divergence of said branch channels is less than 2 milliradians.

8. A method for generating frequency doubled first order electromagnetic radiation comprising the steps:
generating a fundamental frequency electromagnetic radiation;
passing said fundamental frequency electromagnetic radiation through a nonlinear crystal to create a second harmonic electromagnetic radiation;
passing said second harmonic electromagnetic radiation through a waveguide having a plurality of diverging branch channels, each branch channel having a width which will support a mode of said second harmonic electromagnetic radiation.

9. A frequency doubler system comprising:
a waveguide channel comprising a nonlinear crystal host material in combination with a doping material, said host material in combination with said doping material having a higher index of refraction than said host material without said doping material, the waveguide having a first section for converting a fundamental frequency light to a second harmonic light, the waveguide having a second section connected to said first section, the second section having a plurality of diverging branch channels, with each branch channel supporting a mode of said second harmonic light; and
an outer section substantially surrounding said waveguide channel and comprised of said host material without said doping material.

10. The device of claim 9, wherein the angle of divergence of said branch channels is less than 2 milliradians.

11. A data storage system comprising:
a light source for generating a fundamental frequency light;
a waveguide in optical communication with the light source, having a first section waveguide channel comprising a nonlinear crystal for converting said fundamental frequency light to a second harmonic frequency light, the waveguide having a second section waveguide channel optically connected to the first section, the second section having a plurality of diverging branch channels, each branch channel supporting a different mode of said second harmonic light;
an optical recording medium;
an optical transmission means for directing said second harmonic light from the waveguide to the optical recording medium; and
an optical reception means for receiving a reflected second harmonic light beam from the optical recording medium and providing a data signal responsive thereto.

* * * * *